United States Patent Office 3,379,501
Patented Apr. 23, 1968

3,379,501
PHOSPHORIC ACID PURIFICATION
Theodore Leo Treitler, Millburn, and Donald S. Bunin, Metuchen, N.J., assignors to FMC Corporation, New York, N.Y., a corporation of Delaware
No Drawing. Filed Feb. 23, 1965, Ser. No. 434,631
5 Claims. (Cl. 23—165)

ABSTRACT OF THE DISCLOSURE

Wet acid derived phosphoric acid, obtained by acidulating a phosphatic ore with sulfuric acid, and having a concentration of from about 10 to about 30% by weight $P_2O_5$ is treated to remove substantial amounts of impurities by adjusting the calcium ion level of said phosphoric acid to from about 0.25 to about 3% (as CaO), adding hydrofluoric acid to said acid in amounts to react with all of the cation impurities therein, precipitating calcium fluoride along with magnesium, iron and aluminum insolubles, separating the precipitate from the supernatant phosphoric acid and recovering a phosphoric acid having substantially decreased amounts of cation impurities.

---

This invention relates to the purification of phosphorus values recovered from phosphatic ores, and more particularly to the purification of phosphoric acid obtained by acidulation of phosphatic ores with sulfuric acid.

One of the best known processes for recovering the phosphorus values from a phosphatic ore in the form of phosphoric acid is the "wet acid" process. In this process a phosphate rock which generally contains phosphorus in the form of $Ca_{10}F_2(PO_4)_6$ is acidulated with sulfuric acid to precipitate calcium values and recover phosphoric acid. The resultant acid product, termed green acid, is suitable for use in fertilizer applications without further treatment, but is not suitable for most other applications because of its relatively high impurity level.

It has been customary to treat the wet acid to remove undesirable amounts of cation impurities such as iron, aluminum and magnesium. One simple means of removing these cation impurities is to increase the pH of the "wet acid" derived phosphoric acid until the iron, aluminum, calcium and magnesium impurities have been precipitated. The difficulty with this purification system is that large amounts of $P_2O_5$ values are lost at the high pH values. More specifically, at a pH of about 7, at which most of the iron and aluminum values can be removed, up to about 25% of the $P_2O_5$ values are lost. Higher pH values are necessary to remove calcium and magnesium values and these will, of course, increase the $P_2O_5$ losses. Further, as one increases the pH of the acid the resultant product will be converted progressively to the salts of phosphoric acid which are not as desirable as the acid per se. Other purification methods that have been devised include heat treatments to precipitated metaphosphates followed by filtrations, extractions and reacidulations to recover a purified acid. However, these methods are expensive and require substantial investments in mechanical equipment.

As a result there has been a need for a process which will reduce the impurity levels of "wet acid" derived phosphoric acid to acceptable values at minimum cost and in a simplified operation.

This reduction in impurities of "wet acid" is the principal object of the present invention.

Other objects will be apparent from the following description.

I have found that "wet acid" derived phosphoric acid having a concentration of from about 10 to about 30% by weight $P_2O_5$ can be treated to remove substantial amounts of impurities by (a) adjusting the calcium ion level of the phosphoric acid solution as (CaO) to from about 0.25% to about 3% (and preferably from 1 to about 3%) by weight, (b) adding hydrofluoric acid in amounts sufficient to react with all the cation impurities in said acid, (c) precipitating calcium fluoride along with magnesium, iron and aluminum insolubles, (d) separating the precipitated calcium fluoride and coprecipitated magnesium, iron, and aluminum insolubles from the supernatant phosphoric acid, and (e) recovering a phosphoric acid having substantially decreased amounts of cation impurities.

The purification technique of this invention is based upon the discovery that aluminum, magnesium, and iron insolubles will coprecipitate with calcium fluoride when sufficient amounts of the latter are precipitated in a phosphoric acid solution. This coprecipitation phenomena permits substantial reduction of magnesium, iron, and aluminum impurities in the phosphoric acid.

In carrying out the present invention the wet acid process phosphoric acid is adjusted so that it has a concentration of from about 10% to about 30% by weight $P_2O_5$, with about 10% to about 20% being preferred. Thereafter, the calcium level of the acid (as CaO) is adjusted to from about 0.25% to about 3% CaO by weight. Since typical wet acid process, phosphoric acid normally contains a maximum of about 0.25% CaO, calcium addition is desirable to reach the preferred concentration of 1% for greatest purification. Calcium addition is achieved most conveniently by adding calcium carbonate or other soluble calcium compound whose anion does not remain in solution or does not contaminate the solution.

After the phosphoric acid solution has been adjusted to obtain the desired concentration and calcium content, hydrofluoric (HF) acid is added to the mixture in amounts sufficient to precipitate the cations in the solution. The HF acid is most conveniently added as a 5–15% aqueous solution of hydrogen fluoride. It is added in amounts sufficient to precipitate at least all of the available cations in the solution. Generally, a slight excess is desirable. Addition of amounts of HF acid on the order of about 5% by weight have been found operative. The addition of HF acid and the subsequent precipitation is most conveniently carried out at ambient temperatures, but temperatures within the range of 0° to 100° C. can be employed. During the above reaction the "wet acid" derived phosphoric acid should have a pH below about 2.0 since substantial amounts of $P_2O_5$ are lost at higher pH values. When the pH of the acid mixture is kept below about 2.0 and, preferably at a pH of about 1.5, no loss of $P_2O_5$ is obtained.

The resulting hydrofluoric acid treated, phosphoric acid mixture is then allowed to stand until complete settling of the insolubles has occurred. The phosphoric acid is then separated from the insolubles by any conventional means as, for example, by initial decantation followed by filtration. Alternately, the mixture can be treated in a filter, cyclone separator, etc.

The separated calcium fluoride precipitate may be treated to regenerate hydrogen fluoride by combining the calcium fluoride with silicon dioxide and steam in a thermal reaction zone at temperatures of from about 1000° C. to about 1400° C. The thermal reactor employed in converting calcium fluoride to hydrogen fluoride may be any suitable high-temperature reactor such as rotary kiln or a fluid bed. The reaction produces calcium silicate and hydrogen fluoride in accordance with the following formula:

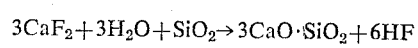

In this way hydrogen fluoride is regenerated and recirculated in the process and no additional HF other than make-up need be used in the process.

The resulting phosphoric acid product purified by the above process has a concentration of from about 10% to about 30% by weight $P_2O_5$. Where desired, the phosphoric acid may be heated in order to concentrate it to $P_2O_5$ values of 50% or more. This concentrating step substantially decreases the CaO and $SO_3$ values of the acid; the calcium and $SO_3$ values precipitate as calcium sulfate.

The following examples are given to illustrate the present invention and are not deemed to be limiting thereof.

EXAMPLE 1

Run A.—A "wet acid" derived phosphoric acid was made up by acidulation of phosphate rock with sulfuric acid so that the following composition was obtained:

| | Percent |
|---|---|
| $P_2O_5$ | 30 |
| CaO | 0.25 |
| MgO | 0.56 |
| $Fe_2O_3$ | 1.30 |
| $Al_2O_3$ | 1.20 |

The above "wet acid" derived phosphoric acid was treated with hydrofluoric acid having a concentration of 50% by weight, in an amount of about 2% of the weight of the phosphoric acid. After addition, the mixture was allowed to stand for ¾ of an hour and the phoshoric acid was centrifuged to remove insolubles. The composition of the acid before and after the HF treatment and the percent of cations removed is given below in Table I.

TABLE I

| Cation Oxide | Before HF Treatment, Percent by Wt. | After HF Treatment, Percent by Wt. | Percent Removed |
|---|---|---|---|
| CaO | 0.25 | .12 | 52 |
| $Fe_2O_3$ | 1.30 | 1.05 | 19 |
| MgO | 0.56 | .03 | 95 |
| $Al_2O_3$ | 1.20 | .72 | 40 |

Run B.—A number of synthetic mixtures of "wet acid" derived phosphoric acid were made up similar to that in Run A except that only one cation impurity was placed in each of the synthetic mixtures made up. To each of these mixtures was added hydrofluoric acid in the same concentration and the same amount as set forth in Run A. The amount of cations prior to and subsequent to the addition of hydrofluoric acid is set forth in Table II.

TABLE II

| Cation Oxide | Before HF Treatment, Percent by Wt. | After HF Treatment, Percent by Wt. | Percent Removed |
|---|---|---|---|
| CaO | 0.25 | .12 | 52 |
| $Fe_2O_3$ | 1.30 | 1.30 | 0 |
| MgO | 0.56 | 0.56 | 0 |
| $Al_2O_3$ | 1.20 | 1.20 | 0 |

As will be seen in Table II, where only one cation impurity was present in each of the synthetic mixtures, substantially no removal of either iron, magnesium or aluminum occurred on addition of the hydrofluoric acid in the absence of calcium. Removal of these cations occurs only when they are coprecipitated along with calcium fluoride in the manner set forth in Run A.

EXAMPLE 2

A "wet acid" derived phosphoric acid sample having the amount of impurities specified in Table III was treated with sufficient calcium carbonate to bring the CaO level up to 1.75%. Thereafter, hydrofluoric acid, having a concentration of 50%, was added to the acid mixture in an amount of about 5% by weight and the resulting precipitate was allowed to settle for 16 hours. The impurity level of the resulting acid and the percent of cation removed is set forth in Table III.

TABLE III

| Oxide Impurity | Before HF Treatment, Percent by Wt. | After HF Treatment, Percent by Wt. | Percent Removed |
|---|---|---|---|
| CaO | 1.75 | 0.19 | 89 |
| MgO | .49 | .12 | 75 |
| $Fe_2O_3$ | .79 | .52 | 34 |
| $Al_2O_3$ | 1.15 | .18 | 84 |
| $SO_3$ | 2.32 | .57 | 75 |

EXAMPLE 3

A "wet acid" derived phosphoric acid containing 53% $P_2O_5$ was diluted with water to yield a 20% $P_2O_5$ acid. Sufficient calcium was then added as calcium carbonate to bring the CaO value to 3.05%. Thereafter, enough hydrofluoric acid was added as a 10% solution to bring the fluoride concentration up to about 4.9%. A precipitate resulted which was allowed to settle and which was filtered from the remaining phosphoric acid. The acid filtrate was heat evaporated until its $P_2O_5$ concentration reached 52%. Thereafter, the acid was analyzed and the impurities levels determined. The impurity level of various cations prior to the hydrofluoric acid treatment and subsequent thereto and the percent cations removed are reported in Table IV.

TABLE IV

| Oxide Impurity | Before HF Treatment, Percent by Wt. | After HF Treatment, Percent by Wt. | Percent Removed |
|---|---|---|---|
| CaO | 3.05 | .48 | 84 |
| MgO | .49 | .07 | 86 |
| $Fe_2O_3$ | .79 | .38 | 52 |
| $Al_2O_3$ | 1.15 | .13 | 89 |
| $SO_3$ | 2.33 | .03 | 99 |

This example illustrates that the addition of calcium in amounts as high as 3% is more effective in removing offending cations from the phosphoric acid solution than using lesser amounts of calcium. However, more calcium ions remain in the phosphoric acid than if lower quantities of calcium, e.g., about 1%, are added to the phosphoric acid solution.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Process of purifying phosphoric acid obtained by acidulation of a phosphatic ore with sulfuric acid, said phosphoric acid having a concentration of from about 10% to about 30% by weight $P_2O_5$ which comprises (a) adjusting the calcium ion level of said phosphoric acid to from about 0.25% to about 3% by weight calculated as CaO, (b) adding hydrogen fluoride to said phosphoric acid in amounts sufficient to react with all of the cation impurities, (c) precipitating calcium fluoride and coprecipitating magnesium, iron, and aluminum insolubles, (d) separating said precipitated calcium fluoride and said insolubles from the supernatant phosphoric acid, and (e) recovering phosphoric acid having substantially decreased amounts of impurities.

2. Process of claim 1 in which the calcium ion level is from about 1% to about 3% by weight, calculated as CaO.

3. Process of claim 1 in which the hydrogen fluoride is added as a 5–15% aqueous solution in amounts up to about 5% by weight of said phosphoric acid.

4. Process of claim 1 in which the calcium ion level of said phosphoric acid is adjusted by adding calcium ions in the form of calcium carbonate.

5. Process of claim 1 in which said phosphoric acid has a concentration of from about 10% to 20% by weight $P_2O_5$.

References Cited

UNITED STATES PATENTS 3,323,864   6/1967   Lapple _____ 23—165

FOREIGN PATENTS 467,843   6/1937   Great Britain.

OSCAR R. VERTIZ, *Primary Examiner.*

A. GREIF, *Assistant Examiner.*